March 24, 1953 A. S. NORCROSS 2,632,325

YARN-TESTING APPARATUS

Filed June 1, 1950 10 Sheets-Sheet 1

INVENTOR.

Austin S. Norcross

BY Roberts, Cushman & Grover

Att'ys.

March 24, 1953 A. S. NORCROSS 2,632,325

YARN-TESTING APPARATUS

Filed June 1, 1950 10 Sheets-Sheet 2

INVENTOR.
Austin S. Norcross
BY Roberts, Cushman & Grover
Att'ys.

March 24, 1953 A. S. NORCROSS 2,632,325

YARN-TESTING APPARATUS

Filed June 1, 1950 10 Sheets-Sheet 3

INVENTOR.
Austin S. Norcross
BY Roberts, Cushman & Grover
Att'ys.

INVENTOR.
Austin S. Norcross
BY Roberts, Cushman & Grover
Att'ys.

March 24, 1953 | A. S. NORCROSS | 2,632,325

YARN-TESTING APPARATUS

Filed June 1, 1950 | 10 Sheets-Sheet 5

INVENTOR.
Austin S. Norcross
BY Roberts, Cushman & Grover
Att'ys.

March 24, 1953 A. S. NORCROSS 2,632,325

YARN-TESTING APPARATUS

Filed June 1, 1950 10 Sheets-Sheet 6

INVENTOR.
Austin S. Norcross
BY Roberts, Cushman & Grover
Att'ys.

March 24, 1953 A. S. NORCROSS 2,632,325

YARN-TESTING APPARATUS

Filed June 1, 1950 10 Sheets-Sheet 7

INVENTOR.

Austin S. Norcross

BY Roberts, Cushman & Grover

Att'ys.

March 24, 1953 A. S. NORCROSS 2,632,325

YARN-TESTING APPARATUS

Filed June 1, 1950 10 Sheets-Sheet 8

Inventor
Austin S. Norcross
by Roberts, Cushman + Grover
Att'ys.

INVENTOR.
Austin S. Norcross
BY Roberts, Cushman & Grover
Att'ys.

YARN-TESTING APPARATUS

Filed June 1, 1950 10 Sheets-Sheet 10

Inventor
Austin S. Norcross
by Roberts, Cushman & Grover
Att'ys.

Patented Mar. 24, 1953 2,632,325

UNITED STATES PATENT OFFICE 2,632,325

YARN-TESTING APPARATUS

Austin S. Norcross, Newton, Mass.

Application June 1, 1950, Serial No. 165,571

24 Claims. (Cl. 73—160)

In the determining of the tensile strength of yarn, paper and similar products, the apparatus ordinarily used gives "static" results, i. e. the force required to rupture a test sample as it is stretched between two clamps or jaws which hold the respective ends of the sample. This apparatus is not entirely satisfactory as test results obtained in this manner often cannot be correlated with the dynamic tensile strength characteristics of the yarn, i. e. the resistance to breaking as the yarn is run through a textile machine. Static test results may also vary due to human errors introduced by the difficulty of consistently determining the maximum reading of a moving indicator. A further source of trouble is from "jaw" breaks, i. e. the rupture of the sample being tested in or near the point of clamping.

Objects of this invention are to provide a yarn tester which will determine the tensile strength of a test sample, which can be adjusted to apply a constant tension of predetermined value to a test sample, which will determine the stress-strain characteristics of a test sample, which is automatic in operation, making successive tests without attention from the operator, which does not require a skilled operator, which stops automatically upon the occurrence of abnormal testing conditions, which can be used to control associated equipment, which tests under dynamic conditions, which makes a record of the test, which is rapid in operation, and which advances the art generally.

In a broad aspect the invention contemplates a testing device for yarn or similar materials comprising two sets of driven rolls movably mounted with respect to each other with means for threading the test specimen of yarn so that it successively runs through the respective sets of rolls. Control means are provided for controlling the peripheral rotational speed of one set of rolls with respect to the peripheral rotational speed of the second set of rolls. The force exerted by the tension in the yarn resulting from the speed change is counterbalanced by restraining means for holding the movably mounted set of rolls which means are associated with measuring means including either indicating or recording means for determining the tension force in the yarn.

In a more specific aspect each set of rolls includes two inner and two outer rolls with their axes in parallel relationship so that the peripheral surface of each inner roll is adjacent with both the peripheral surfaces of the other inner roll and one of the outer rolls. The axes of the rolls are preferably but not necessarily in a common plane so that journal blocks for journaling the ends of the respective rolls can be urged towards each other by a spring thereby to bring the peripheral surfaces of adjacent rolls into contact.

In another aspect one roll of each set is driven by a respective motor, the remainder of the rolls in each set being driven by the frictional contact. The motor driving one set of rolls is operated at substantially constant speed during the testing period. The motor driving the other set of rolls has associated therewith control means including a timer and motor speed changing means for varying the speed of the motor in response to a cycle determined by the timer.

In a more specific aspect one of the roll drive motors is connected in series with a variable impedance, such as a Variac or rheostat. A second variable impedance or resistor is connected with one of the shaded windings of a motor operating the timer. Both impedances are varied conjointly by the timer motor, the first impedance gradually reducing the voltage applied to the roll drive motor thereby to reduce its speed, the second impedance changing the resistance in series with the shaded winding gradually to decrease the speed of the timer motor and therefore to decrease the rate at which voltage applied to the roll drive motor is reduced as the breaking point of the test specimen is approached.

In another aspect a weigh bar is attached to one set of rolls which are pivotally mounted. Balancing means are provided for automatically adjusting the weigh bar so that the pivoted rolls are held against the force exerted by the tension in the yarn. The balancing of the weigh bar can, among other ways, be accomplished by means of a rider upon the weigh bar. The rider is automatically positioned by coupling means operated by a reversible motor which can be but is not necessarily the motor operating a recording pen included in the measuring means so that the tension in the yarn is balanced by the force exerted by the rider. Movement of the weigh bar operates electrical contacts which control the direction of rotation of the reversible motor so that the rider is moved in a direction to balance the bar. It is possible to obtain such balancing action with only one pair of contacts which are closed by the bar when it is at one limit of its path of travel thereby to short circuit the appropriate shaded winding so that the motor rotates in a direction to move the rider in a direction to balance the weigh bar. A resistor is permanently connected across the other shaded winding to operate the motor at a reduced speed in the opposite direction when the contacts are open, the effect of this shunting resistor being overcome by the short circuiting of the first winding when the contacts are closed.

In a further aspect one set of rolls is mounted above the other set. Upon the breaking of the yarn the portion of the yarn hanging from the upper set of rolls is picked up and automatically rethreaded through the lower set of rolls by means of one or more belts. Preferably two belts are used each of which passes over an idler roll thence between one pair of inner and outer rolls of the lower set, thence between the inner rolls, thence between the second pair of inner and outer rolls, the idler rolls being located so that as the belts approach the first pair of inner and outer rolls of the lower set they form a V-slot into which the yarn drops after passing through the upper rolls. The yarn is picked up by the belts in the V-slots and threaded through the lower rolls by the belts.

These and other objects and aspects will be apparent from the following description of several illustrative specific embodiments referring to drawings wherein Fig. 1 is a front elevation view of the testing device with the outer door removed;

Figure 1:
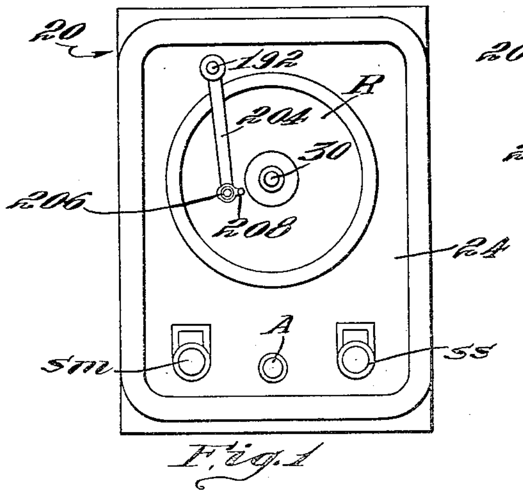
Figure 3:
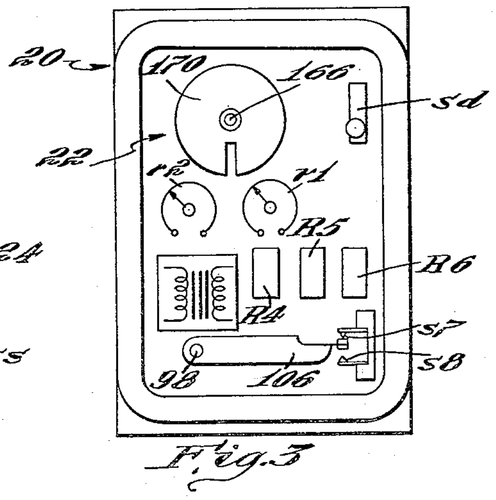
Fig. 3 is a front elevation view with both the outer and inner doors removed.
Figure 4:
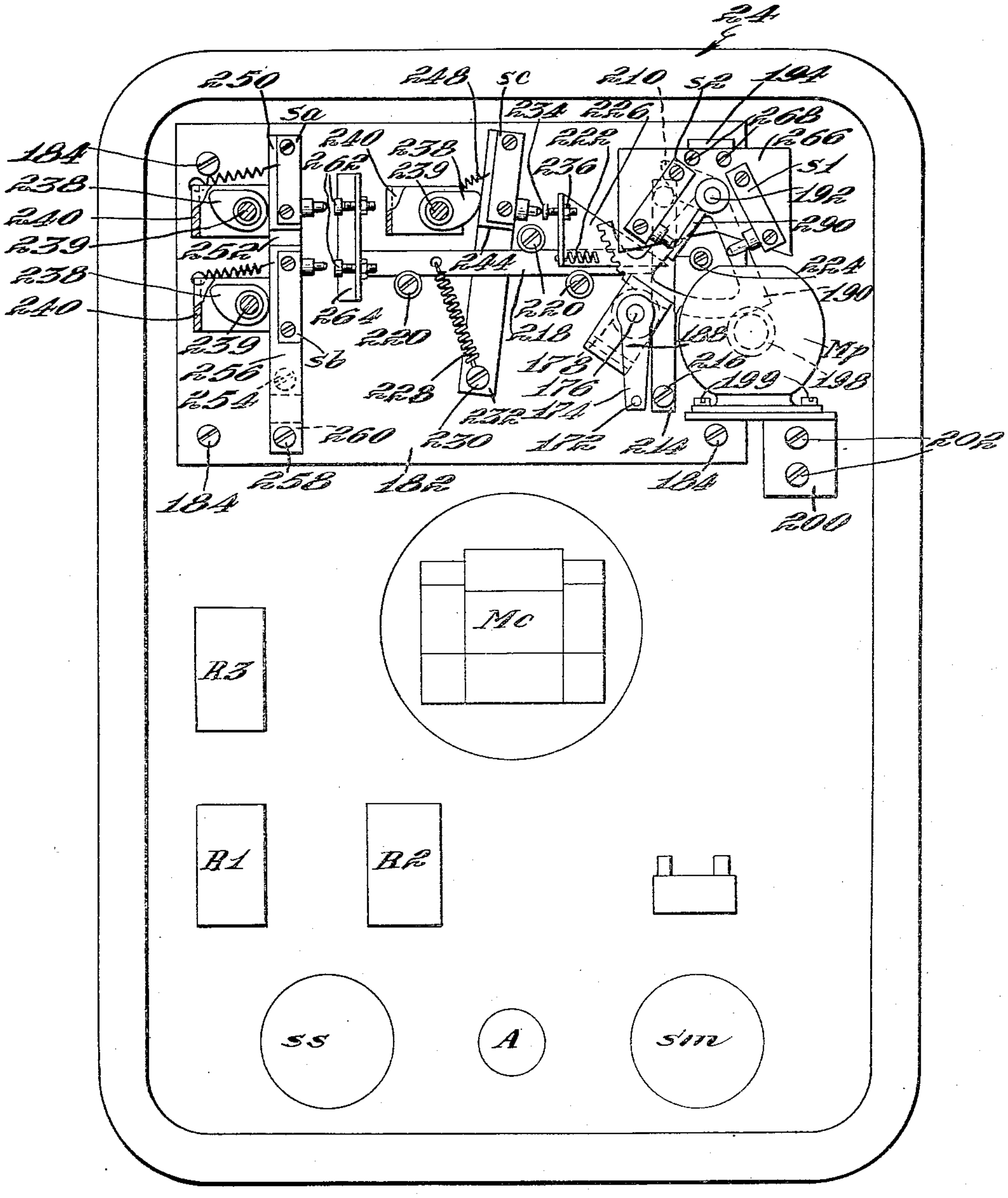
Fig. 4 is a rear elevation view of the inner door.
Figure 8:
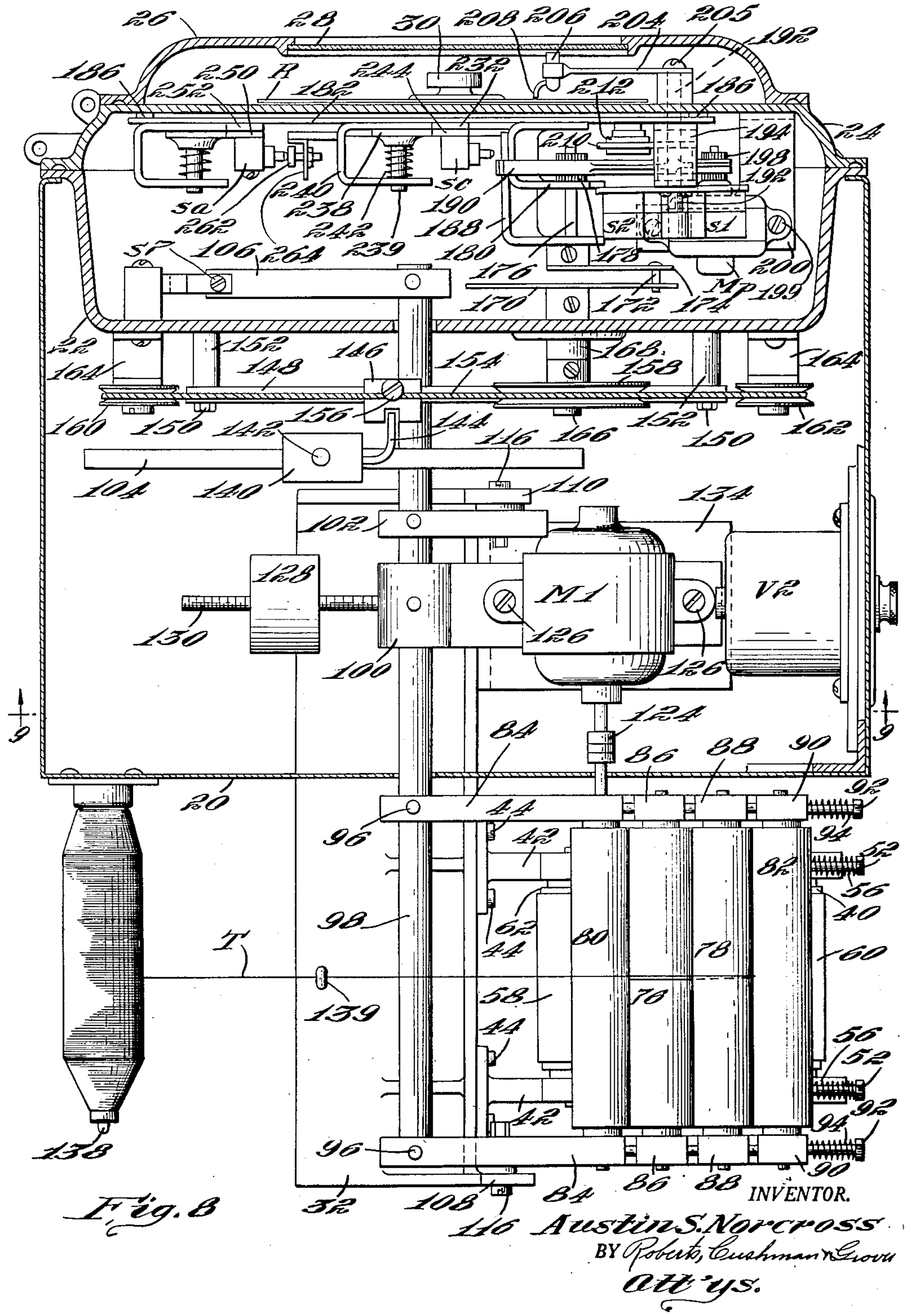
Fig. 8 is a sectional view on line 8—8 of Fig. 5.
Figure 9:
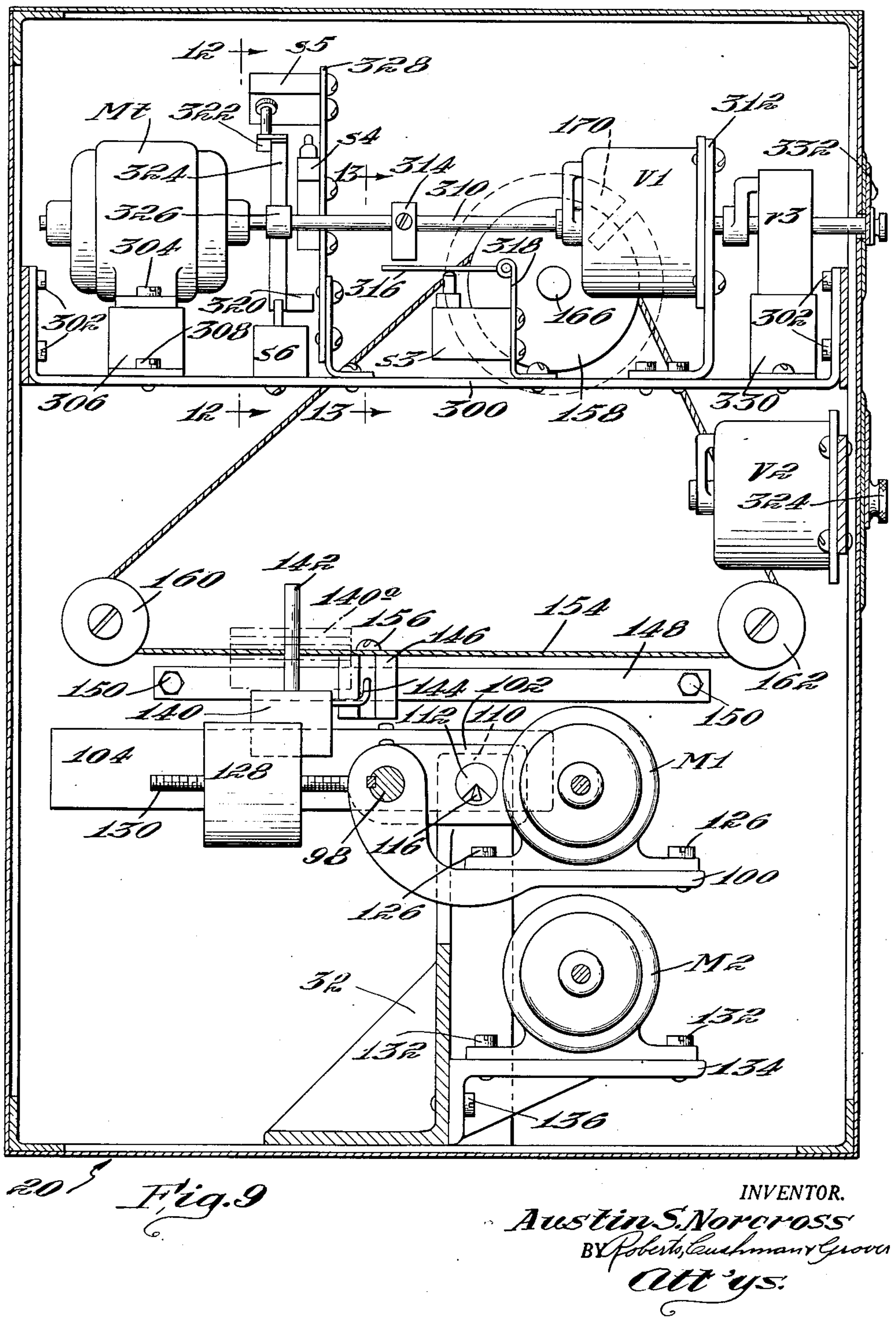
Fig. 9 is a sectional view on line 9—9 of Fig. 8.

Referring particularly to Figs. 1 and 3, the embodiment of the yarn tester illustrated therein comprises a sheet metal casing 20 of conventional design with its corners re-enforced by means of angle irons as is shown in Fig. 9. The front of the casing 20 is closed by a recessed panel 22 (Figs. 3 and 8) whereupon are supported some of the elements of the electrical control system of the tester and an inner door 24 (Figs. 1 and 8) whereupon is mounted the recording mechanism as is shown in Fig. 4 which will be described in detail hereinafter. An outer door 26 (Fig. 8) having a transparent window 28 encloses a chart R which is secured by a knurled hand nut 30 to the projecting end of the shaft of a chart motor Mc (Fig. 4) mounted upon the rear of the inner door 24.

Figure 2:
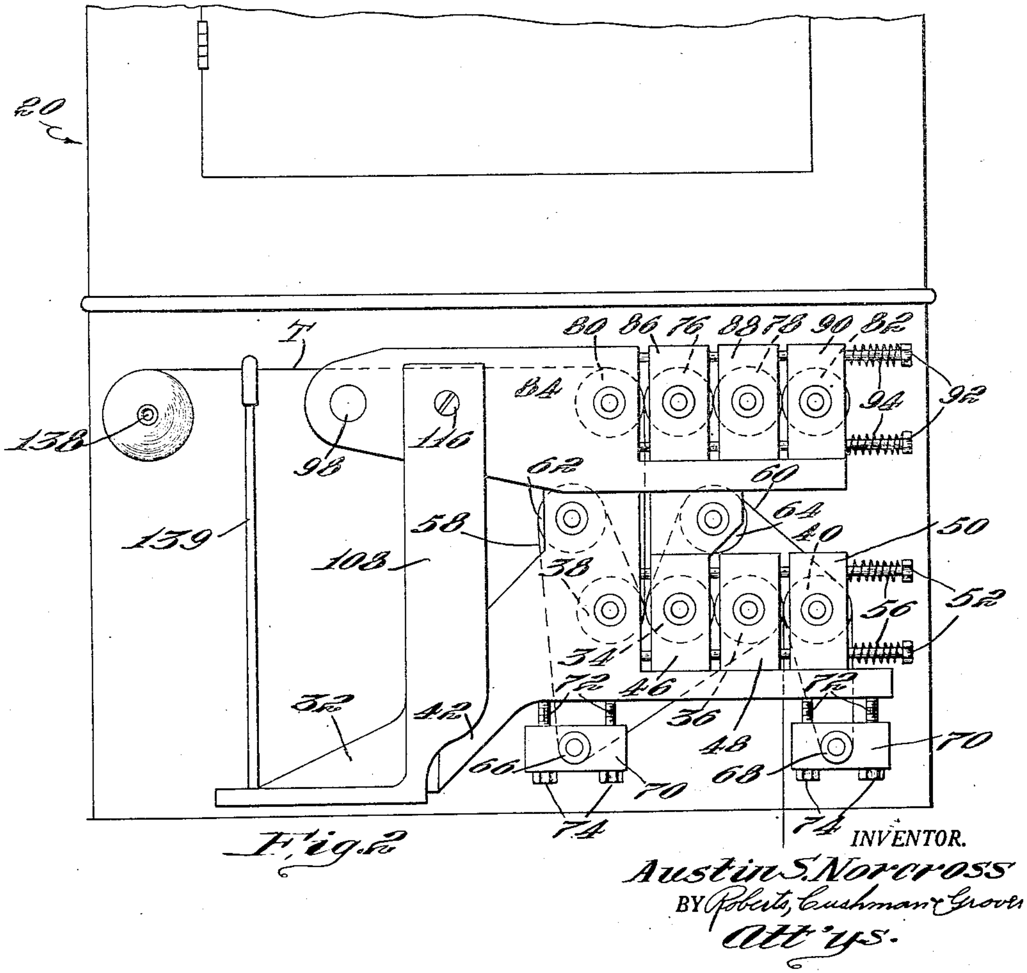
Fig. 2 is a rear elevation view with the top portion of the casing broken away.
Figure 5:
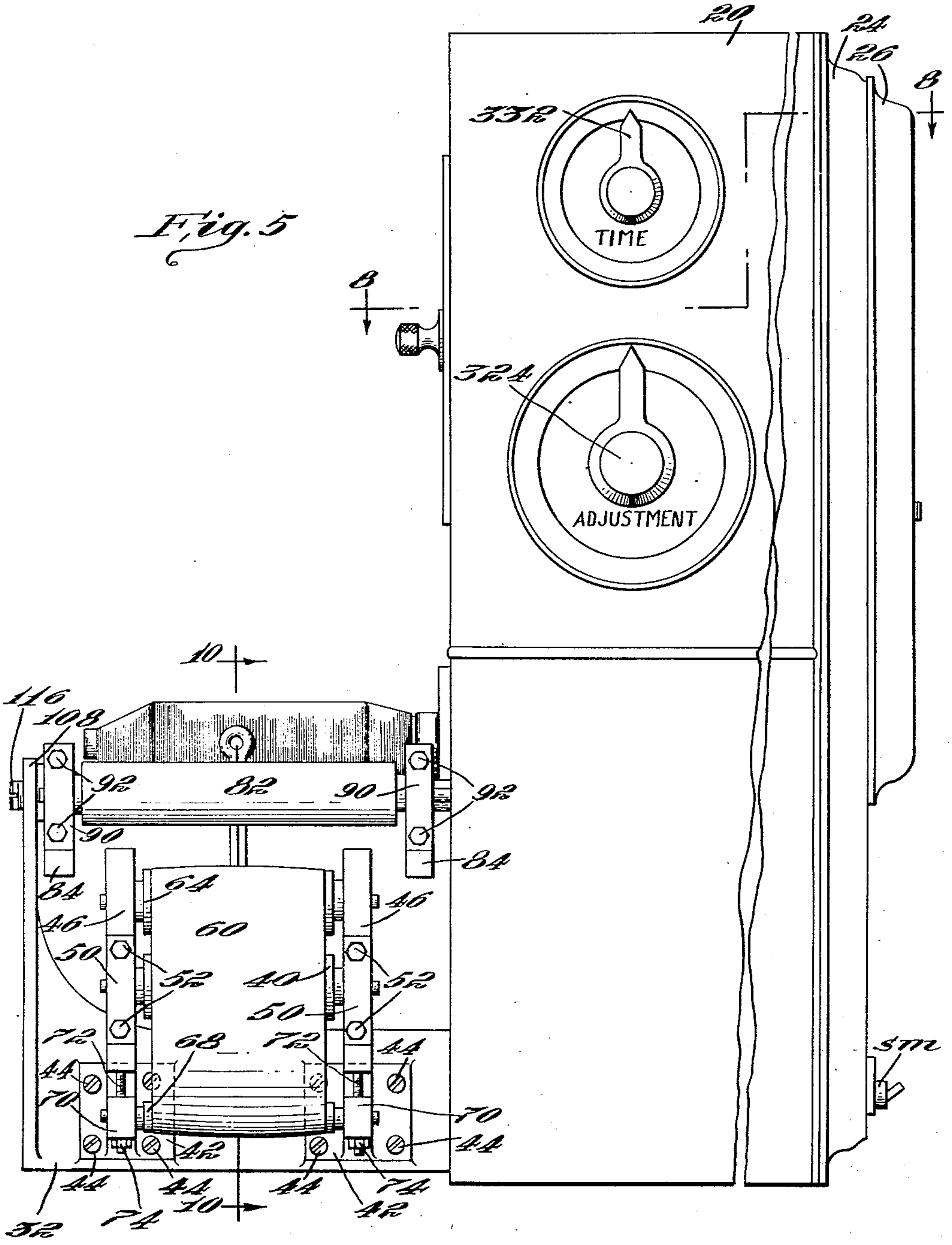
Fig. 5 is a side elevation view.

As is shown in Figs. 2, 5 and 8 two sets of test rolls are secured to the rear of the casing 20 by means of a cast L-shaped cantilever supporting member 32. The lower set of rolls, comprises two inner rolls 34 and 36 and two outer rolls 38 and 40 which are journaled, as described below, so that their axes are parallel and in a common horizontal plane. Each end of the driving roll 38 is journaled in a respective bearing bracket 42 which is attached to the vertical flange of the L-shaped member 32 by means of cap screws 44. The ends of the rolls 34, 36 and 40 are journaled in respective bearing blocks designated 46, 48 and 50 which are slidably carried upon two studs 52 whose ends engage threaded apertures in the bearing brackets 42. A spring 56 is inserted between the head of each stud 52 and the correlated bearing block 50 so that the resilient peripheral surface of each roll is urged towards the peripheral surface of an adjacent roll thus making it necessary to drive only one roll as will be described hereinafter, the remaining rolls being frictionally driven. The above described arrangement of the roll bearing blocks also permits the accommodation of test samples of different diameters without the necessity of adjustment of the roll spacing.

The lower set of rolls is provided with automatic threading means for threading the test sample between the rolls, such means comprising two belts 58 and 60 which pass over idler rolls 62 and 64 respectively, thence between the outer roll 38 and the inner roll 34, thence under the inner roll 34 and up between the inner rolls 34 and 36, and thence over the top of the inner roll 36 and down between the inner roll 36 and the outer roll 40. As the belt 58 leaves the inner roll 36, it next passes around an idler roll 66 and thence up around the idler roll 62. As the belt 60 leaves the outer roll 40, it passes around an idler roll 68, thence back over the opposite side of the roll 40 and around the idler roll 64.

Figure 10:
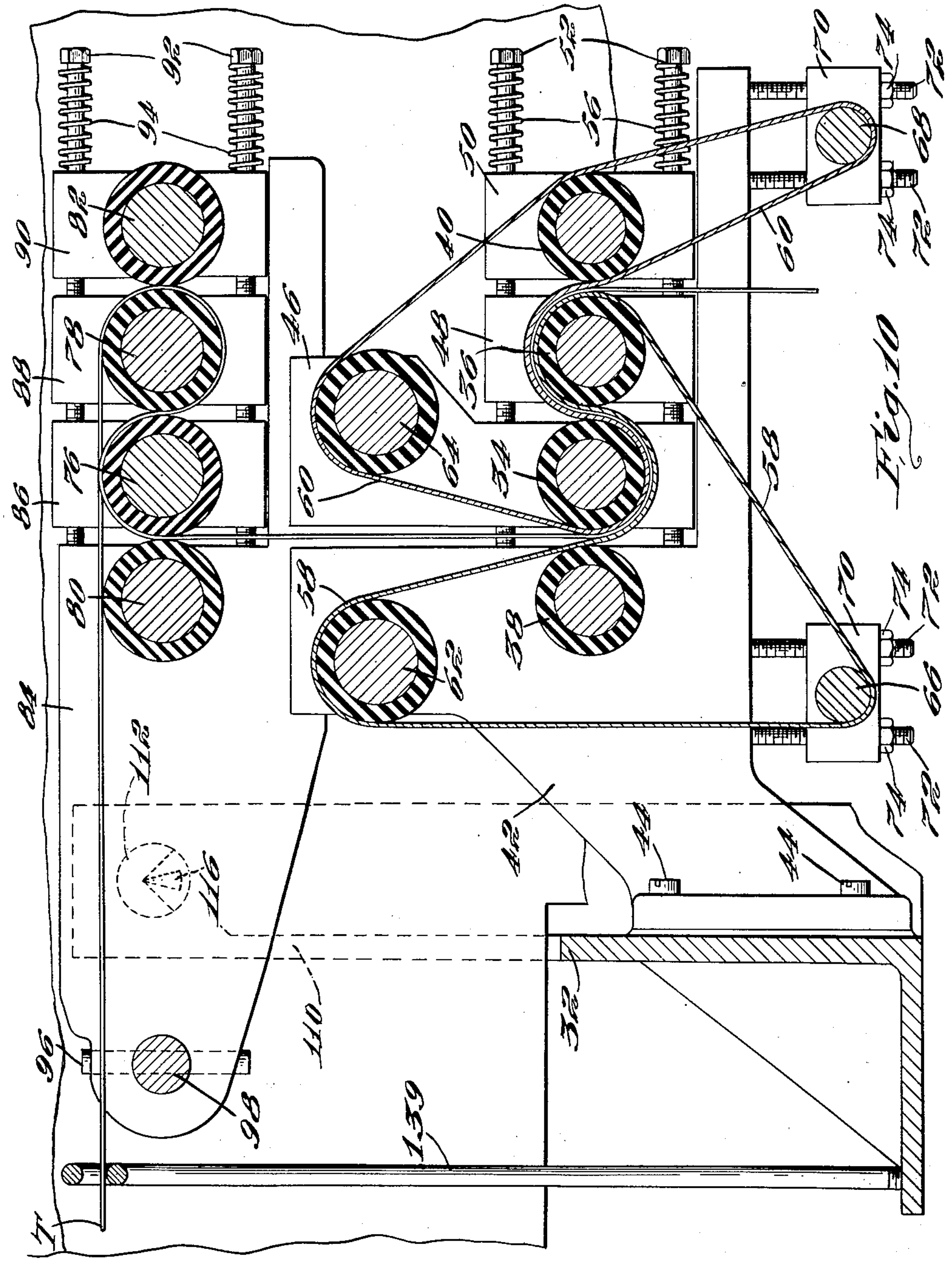
Fig. 10 is a partial sectional view on line 10—10 of Fig. 5.

As is shown in Fig. 10, the ends of the idler roll 62 are journaled in extensions of the brackets 42. The ends of the idler roll 64 are journaled in similar extensions from the bearing block 46 so that the belts form a V slot as they approach the first pair of outer and inner rolls 34 and 38. As the yarn drops into the V slot after leaving the upper set of rolls, it is picked up and threaded through the rolls by the belts. The ends of the idler rolls 66 and 68 are journaled in respective bearing blocks 70 which are carried upon studs 72 engaging threaded apertures in the bottom of the bearing brackets 42. The tension in the belts 58 and 60 is determined by the adjusted position of the blocks 70 upon the threads of the studs 72. The blocks are locked in position by the nuts 74.

The upper set of rolls comprises two inner rolls 76 and 78 and two outer rolls 80 and 82. Each end of the driving roll 80 is journaled in a pivotally mounted arm 84. The ends of the driven rolls 76, 78 and 82 are journaled in bearing blocks 86, 88 and 90 respectively which blocks are slidably carried upon studs 92 extending from the ends of the arms 84 so that the axes of the rolls are parallel and in a common plane.

A spring 94 is interposed between the head of each stud and the correlated bearing block 90 to urge the peripheral surfaces of adjacent rolls into contact.

The respective arms 84 are secured by means of pins 96 to a rod 98 which extends through an aperture into the casing as is shown in Fig. 8. Also secured to the rod 98 are a motor bracket 100, a pivot arm 102, a weigh bar 104 and an electrical contact-making arm 106, the construction and operation of each of which will be described in detail hereinafter. The rod 98 and above mentioned elements carried thereby which comprise the movable assembly are pivotally mounted upon vertical extensions 108 and 110 at the opposite ends of the L-shaped member 32.

Figure 15:
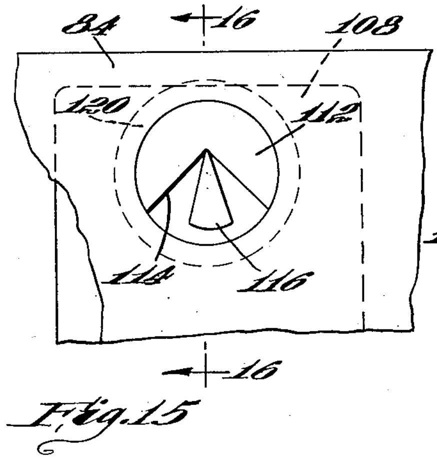
Fig. 15 is an enlarged fragmentary view showing the details of one of the pivots for the movable set of rolls.
Figure 16:
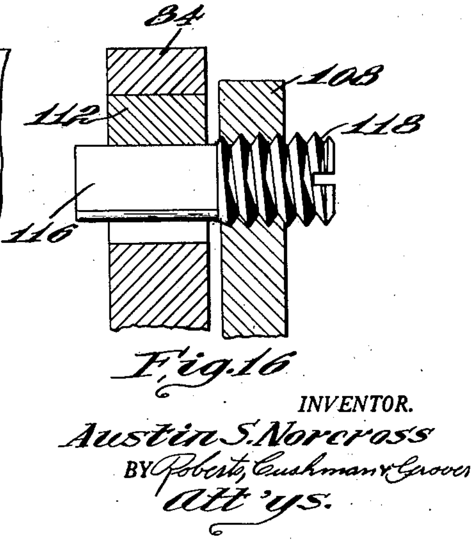
Fig. 16 is a partial section on line 16—16 of Fig. 15.

The details of pivotal connections are shown in Figs. 15 and 16. The upper end of the roll supporting arm 84 has pressed in an aperture therein a circular hardened insert 112 having a cut-away sector 114 which engages a knife edge 116 member. One end of the knife edge 116 member is threaded as at 118, the threads engaging mating threads in an aperture in the extension 108. The other pivotal connection is similar, the thread end of a second knife edge member engaging the threads of an aperture in the extension 110 (Fig. 8) of the L-shaped member 32 so that the knife edge engages the sector of a second insert pressed into an aperture in the pivot arm 102.

The upper set of rolls is driven by a variable speed motor M1 (Fig. 8) whose shaft is connected to the driving roll 80 by means of a flexible coupling 124. The motor M1 is attached to the motor bracket 100 by means of two cap screws 126 so that the motor moves with the upper set of rolls as they pivot upon the knife edges 116. A counterweight 128 is carried upon a threaded member 130 projecting substantially horizontally from the side of the bracket 100 on the opposite side of the rod 98 from that upon which the motor M1 is located. By adjustment of the position of the counterweight 128 upon the threaded member 130, it is possible under no load conditions to bring into static balance the movable assembly carried upon the knife edges 116.

The lower set of rolls is driven by a similar motor M2 (Fig. 9) whose speed is adjustable to change the period of the testing cycle, but is maintained substantially constant during any given test cycle. The motor M2 is attached by two cap screws 132 to a bracket 134 secured to the vertical flange of the L-shaped bracket 32 by screws 136. A flexible coupling (not shown) which is similar to the coupling interposed between the motor M1 and the roll 80, is used to interconnect the motor M2 and the driving roll 38 of the lower set.

The test spicemen or sample T of yarn, paper, thread or similar material is unwound from a bobbin carried upon a spindle 138 (Fig. 8) projecting from the rear of the casing 20 and manually threaded through an eye at the end of a guide piece 139 carried upon the horizontal flange of the L-shaped bracket 32 and thence through the upper set of rolls in a manner similar to that shown in Fig. 10, i. e., between the first pair of inner and outer rolls 78 and 82, thence between the inner rolls 76 and 78 and thence between the second pair of inner and outer rolls 76 and 80. The above described manner of snubbing the test specimen T about the upper set of rolls results in a very firm grip which prevents slippage of the test specimen with respect to the rolls even when testing a yarn, such as nylon having very high tensile strength without sharply bending the outer fibers or strands.

After the sample to be tested has been manually threaded through the upper set of rolls, the motors M1 and M2 are started, as will be described hereinafter, so that the end of the sample drops from between the upper rolls 76 and 80 and descends into the V-slots formed by the threading belts 58 and 60 associated with lower set of rolls. The descending end of the sample is picked up by the belts 58 and 60 and carried through the lower set of rolls by the belts.

From the above it will be evident that with upper and lower rolls of the same diameter and with the motors M1 and M2 operating at the same rotational speed, the portion of the sample extending between the upper and lower sets of rolls will have substantially no force applied thereto; and it will be further evident that when the speed of the motor M1 is decreased, the sample portion between the upper and lower sets of rolls is put under tension which tends to move the upper set of rolls toward the stationary lower set of rolls. The torque resulting from the tension in the test sample tending to rotate the movable assembly about the knife edges 116 in a clockwise direction when viewed as is shown in Figs. 9 and 10 is counteracted by the counterclockwise torque exerted by a rider 140 carried upon the weigh bar 104. The rider 140 is provided with a vertical spindle 142 whereupon can be piled additional weights 140a (Fig. 9) to extend the range of the tester.

The rider 140 is automatically moved back and forth along the weigh bar 104 so that it always supplies the counter torque required to balance the tension force in the test sample. To this end a bent finger 144 projects from one side of the rider 140 so that the end of the finger engages a vertical slot in the face of a sliding block 146 which is carried upon a way 148 secured to the recessed panel 22 (Fig. 8) by bolts 150 at a distance from the panel determined by the length of spacers 152. The width of the slot in the block 146 is enough greater than the diameter of the end of the engaging finger 144 so as not to interfere with the pivotal movement of the weigh bar 104. The block 146 is moved along the way 148 by means of a braided metal belt or cord 154 which is fastened to the top of the block by means of a screw 156. The cord 154 passes once around a driving sheave 158 to which it is pinned, for example by means of a small screw (not shown) and thence down around two idler sheaves 160 and 162 which guide the portions of the cord adjacent the attaching screw 156 in a path parallel to the way 148. The idler sheave 160 is journaled upon the outer leg of a U-shaped bracket 164 (Fig. 8), the inner leg of which is riveted or otherwise secured to the panel 22. The idler sheave 162 is journaled in a similar manner.

The driving sheave 158 is secured to the end of a shaft 166 journaled in a boss 168 projecting from the rear of the panel 22. The shaft 166 extends through the boss 168 and panel 22 to engage an aperture in the hub of a disc 170 which is located upon the opposite side of the panel from the driving sheave 158 as is shown in Figs. 3 and 8. The periphery of the disc is provided with a radial slot (see Fig. 3) which is engaged by a pin 172 at the end of an arm 174 when the inner door 26 is in the closed position shown in Fig. 8. The arm 174 is carried upon one end of a shaft 176, at the other end of which is secured a pinion gear 178. The end of the shaft 176 adjacent the pinion 178 is journaled in one leg of a U-shaped bracket 180. The opposite leg of the bracket 180 is attached by means of screws 181 (Fig. 6) to a mounting plate 182 which is in turn attached to the rear of the inner door 24 by screws 184 (Fig. 4), the plate being slightly distanced from the door by spacers 186 (Fig. 8). The end of the shaft 176 adjacent the arm 174 is journaled in one leg of an L-shaped clip 188, the other leg of which is spot-welded or otherwise secured to the connecting piece of the U-shaped bracket 180.

The pinion 178 meshes with the teeth of a sector gear 190 carried upon a shaft 192 journaled in a U-shaped bracket 194 one leg of which is attached by screws 196 (Fig. 6) to the plate 182. The teeth of the sector gear 190 also engage a driving pinion 198 which is secured to the end of the shaft of a motor Mp (Fig. 4). The base of the motor Mp is secured by screws 199 to a supporting bracket 200 which in turn is attached to the rear of the inner door 24 by means of cap screws 202 (Fig. 4).

One end of the shaft 192 (Fig. 8) projects through an aperture in the inner door 24 so that one end of a pen arm 204 can be secured thereto by means of a screw 205. The other end of the pen arm 204 carries an ink reservoir 206 having a hollow stylus 208 one end of which contacts the chart R.

From the foregoing it will be evident that as the tension in the test sample is increased as the speed of motor M1 is decreased, the rider 140 must be moved further to the left along the weigh beam 104 as viewed in Fig. 9 to counterbalance the increased torque. To move the rider 140 to the left, the sheave 158 and therefore the pinion 178 must be rotated in a clockwise direction by the sector gear 190. The movement of the gear 190 to give clockwise rotation of the pinion 178 requires counterclockwise rotation of the shaft 192 as viewed in Fig. 7 or clockwise as viewed in Fig. 1 which rotation deflects the stylus 208 outwardly upon the chart R, the value of the deflection being a direct measure of the position of the rider 140 upon the weigh bar 104 and therefore of the tension in the test sample.

The motor Mp which operates the pen arm 204 and rider 140 also actuates three switches *sa*, *sb* and *sc* (Fig. 4). To this end, a cam 210 (see Fig. 7 also) is secured to the shaft 192 so that the cammed surface thereof contacts a roll 212 journaled at the end of a lever arm 214 which is pivotally attached as at 216 (Fig. 4) to the panel 182. The arm 214 is in abutment with a horizontal bar 218 carried by three rolls 220 which are each journaled on a respective pin projecting from the front of the panel 182. The bar 218 is maintained in contact with the arm 214 by means of a spring 222 one end of which is attached to a screw 224 in the panel 182. The other end of the spring 222 engages an aperture in the lip of a triangularly shaped piece 226 which is attached to the side of the bar. The above described linkage is further biased by a spring 228 (Fig. 4) which extends downwardly between an aperture in the bar 218 and a screw 230 whose threaded portion engages a threaded aperture in the panel 182. The screw 230 also acts as a pivot for an arm 232 which has attached to the side of the upper end thereof the switch *sc* so that the actuator for the switch is in the path of the head of a screw 234 which is threaded in the lip of the triangular piece and locked by means of a checknut 236.

Figures 6, 7:
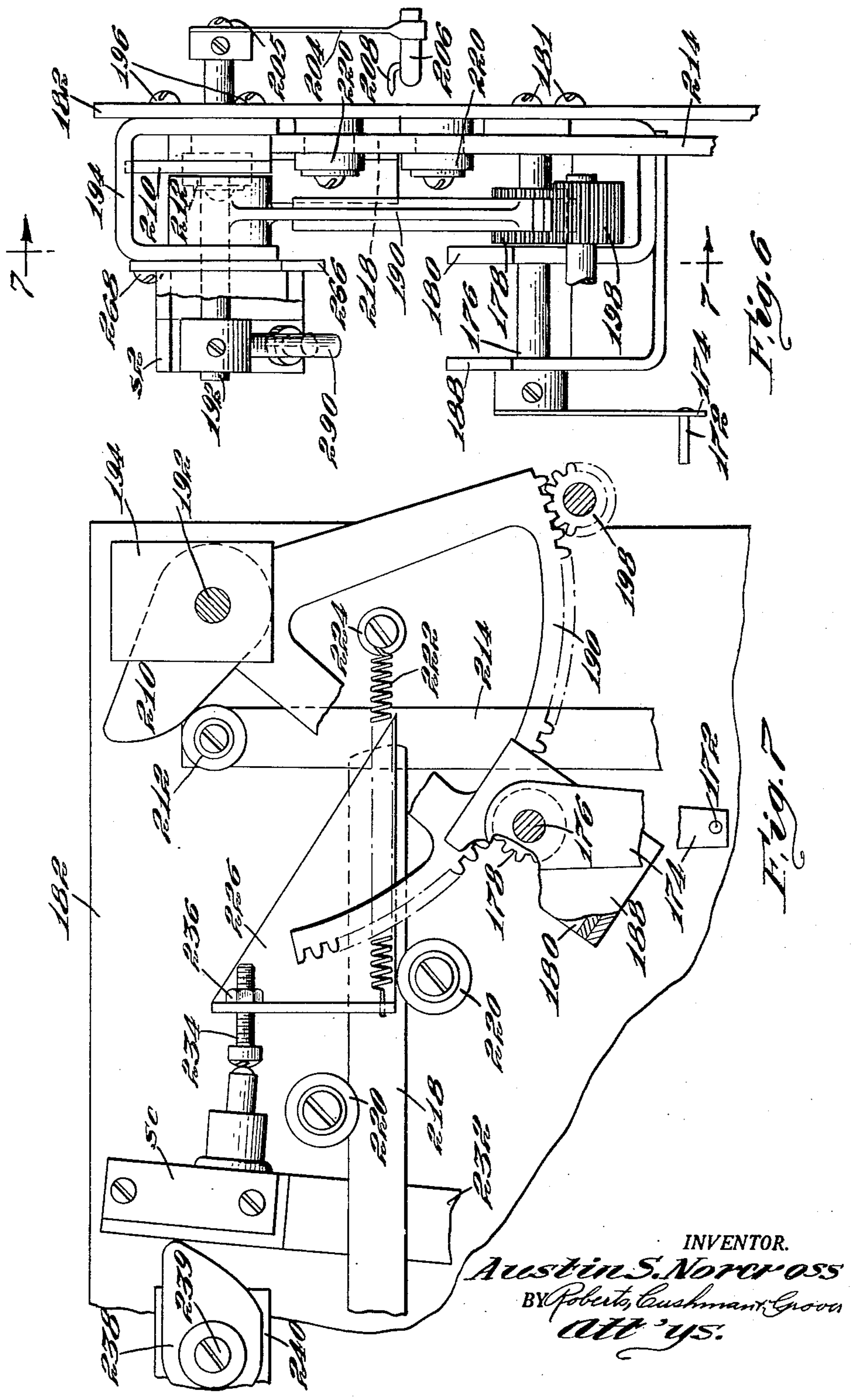
Fig. 6 is an enlarged side elevation view of the mechanism for driving the recording pen.
Fig. 7 is a fragmentary sectional view on line 7—7 of Fig. 6.

The position of the arm 232 and therefore the point in the path of travel of the bar 218 at which the switch *sc* operates is determined by the adjustment of a cam 238. The cam 238 is secured to a shaft 239 journaled in a U-shaped bracket 240 one leg of which is attached to the panel 182. A spring 242 (Fig. 8) is interposed between the cam 238 and the outer leg of the bracket 240 forcing the cam against the inner bracket leg so that the cammed surface thereof comes into contact with a spacer 244 which is interposed between the switch *sc* and the arm 232. The spring 242 also acts as a friction lock to maintain the cam 238 in adjusted position. Such adjustment is made manually by means of a screw driver or similar tool which engages a slot provided in the outer end of the shaft 239 as is shown in Fig. 7. The arm 232 is maintained in contact with the cam 238 by means of a biasing spring 248 the ends of which are attached respectively to the bracket 240 and the arm.

The switch *sa* (Fig. 4) is similarly mounted by means of a spacer 250 upon an arm 252 which is pivoted upon a screw 254 engaging the panel 182. The cam 238, the associated bracket 240 and the shaft 239 are identical in construction and operation to the similar elements described in detail with respect to the switch *sc*.

The switch *sb* is located immediately below switch *sa* being mounted directly upon an arm 256 which is pivotally attached to the panel 182 by means of a screw 258, a spacer 260 being inserted about the screw between the arm and the panel so that the arm does not interfere with the arm 252 carrying the switch *sa*. The bracket 240 and the cam 238 are similar to those described heretofore.

The actuators of switches *sa* and *sb* are contacted by the respective heads of two screws 262 carried by an angle piece 264 attached to the end of the bar 218 as the bar is moved by the cam 210 as has been described above. The cam 238 correlated with arm 252 is adjusted so that the normally closed contacts of the switch *sa* are opened at 95 per cent of the maximum stroke of the pen stylus 208. The cam 238 correlated with the arm 256 is adjusted so that the normally open contacts of the switch *sb* are closed at stylus positions greater than 5 per cent of its maximum stroke.

The switches *sa*, *sb* and *sc* are of the type wherein the actuator is arranged to have overtravel after the contacts have been transferred. The contact switches *sa* and *sb* are connected in the control circuit of the tester and adjusted by movement of the correlated cams 238 so that the contacts of the switch *sa* are opened at a point corresponding to 95 per cent of full scale position of the stylus 208, the contacts of switch *sb* closing above 5 per cent full scale position. The switch *sc* is provided for connection in an auxiliary external alarm or process control circuit (not shown) and its point of operation is adjusted accordingly.

Figure 14:
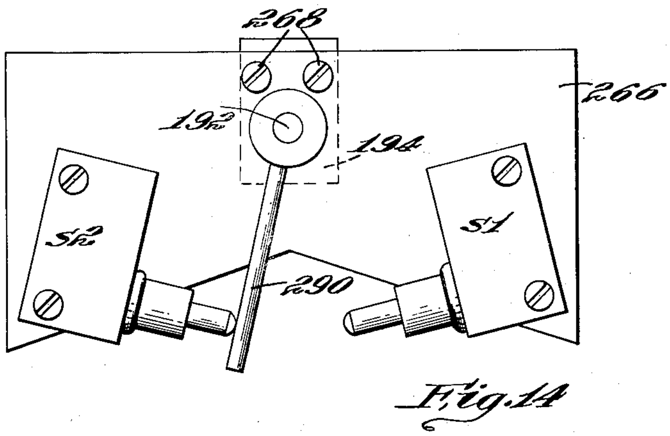
Fig. 14 is an enlarged fragmentary view showing the details of the mounting of the pen motor limit switches.

The shaft 192 carrying the sector gear 190 also operates two limit switches *s1* and *s2* (Figs. 4 and 14) which are mounted upon a plate 266 attached to the outer leg of the U-shaped bracket 194 by screws 268. The shaft 192 extends through the plate 266 and carries an operating finger 290 which contacts the respective actuators for the switches *s1* and *s2* at the opposite limits of its travel. The pen motor Mp is of the type having, in addition to a main field winding *w1* (Fig. 17), two shaded windings *w2* and *w3*, the motor operating in one direction upon the short circuiting or shunting of one of the shaded windings and in the opposite direction when the other shaded winding is shunted. The normally closed contacts of the limit switches *s1* and *s2* are connected respectively in the hereinafter described shunting circuits for the shaded windings and the switches positioned so that the arm 290 operates the switches *s1* and *s2* to open the shunting circuits of the respective shaded windings to stop the motor Mp at the zero and full scale positions of the stylus 208.

Other elements of the control system including a timer and associated switches are mounted upon a shelf 300 (Fig. 9) which is supported by screws 302 in the upper portion of the casing 20 above the motor M1. The timer includes a constant speed reversible motor Mt also of the shaded winding type, attached by screws 304 to a bracket 306 which in turn is secured to the shelf 300 by screws 308. An extension 310 of the motor shaft operates a variable impedance such as the "Variac" V1 which is supported above the shelf 300 by means of an L-shaped bracket 312.

Figure 13:
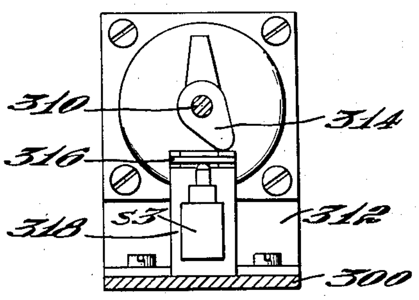
Fig. 13 is an enlarged fragmentary sectional view on line 13—13 of Fig. 9.

The extension shaft 310 also carries a cam 314 which contacts a cantilever 316 extending from the upper end of a bracket 318. A switch *s3* is attached to the bracket 318 with its actuator immediately below the arm 316 so that during each cycle of the shaft 310 the cam 314 depresses the arm and actuator thereby opening the normally closed contacts of the switch *s3*. As is shown in Fig. 13, the cam 314 is shaped so that at the normal operating speed of the shaft 310 the contacts remain open for approximately 15 seconds.

Three additional switches *s4*, *s5* and *s6* whose function will be described in detail below are actuated by fingers 320 and 322 carried upon the respective ends of strap 324 which is secured to the hub 326 mounted upon the shaft 310. The switch *s6* is of the toggle type and is secured directly to the shelf 300 with its toggle arm arranged so as to come into contact with both ends of the strip 324, thereby to be thrown in a position dependent upon the direction of rotation of the shaft 310. The switches *s4* and *s5* are secured to a bracket 328 extending upwardly from the shelf 300 so that their actuators are in the paths of the fingers 320 and 322 respectively.

The shelf 300 also supports a bracket 330 upon which is mounted a variable resistor or potentiometer *r3* operated by the shaft 310 the end of which extends through an aperture in the side of the casing 20 and which carries an indicator 332. A second variable impedance V2 or "Variac" is mounted below the shelf 300 of a control knob 324 upon the side of the casing 20.

Figure 11:
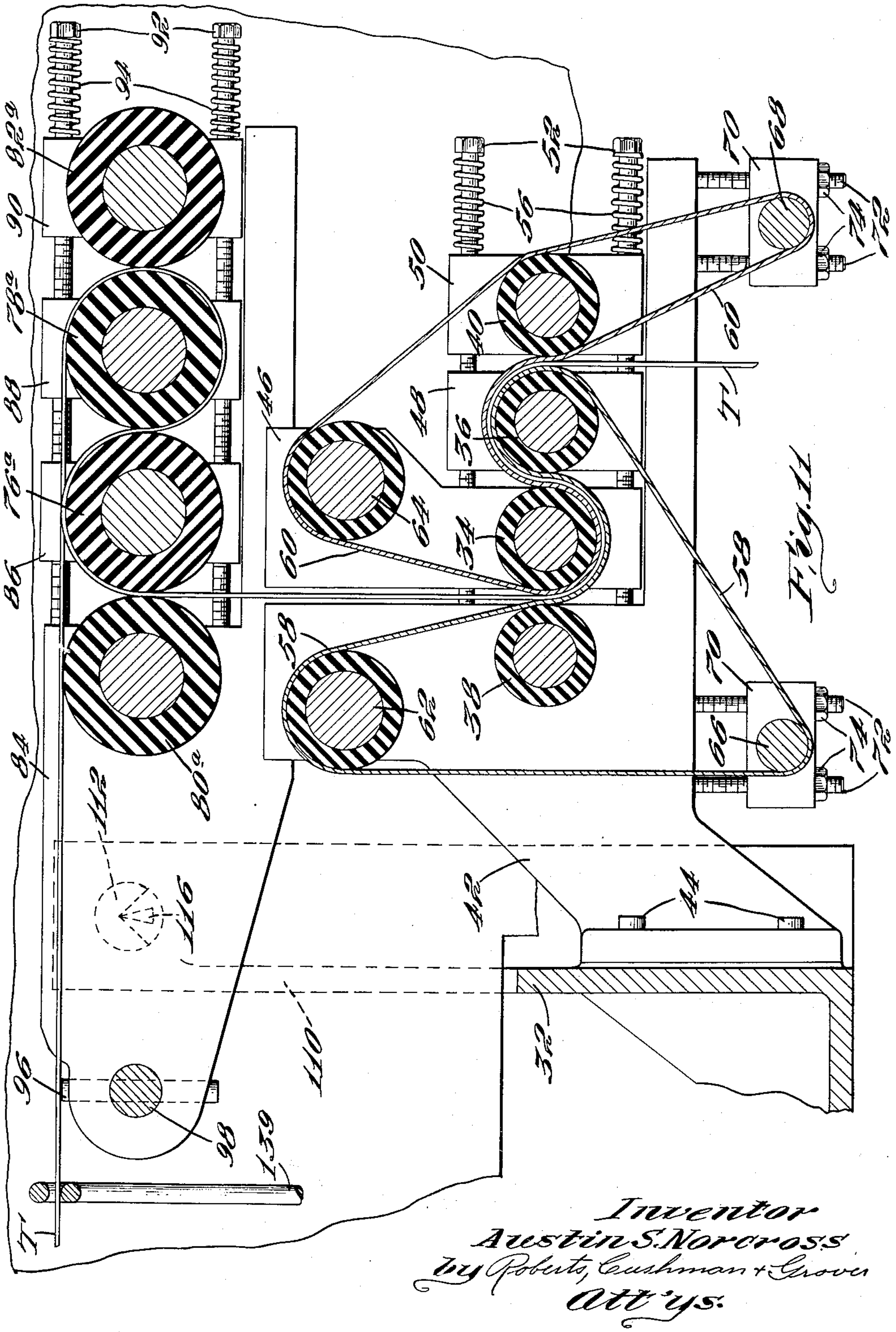
Fig. 11 is a view similar to that in Fig. 5 of a second embodiment of the invention wherein the sets of rolls are of different diameter.
Figure 17:
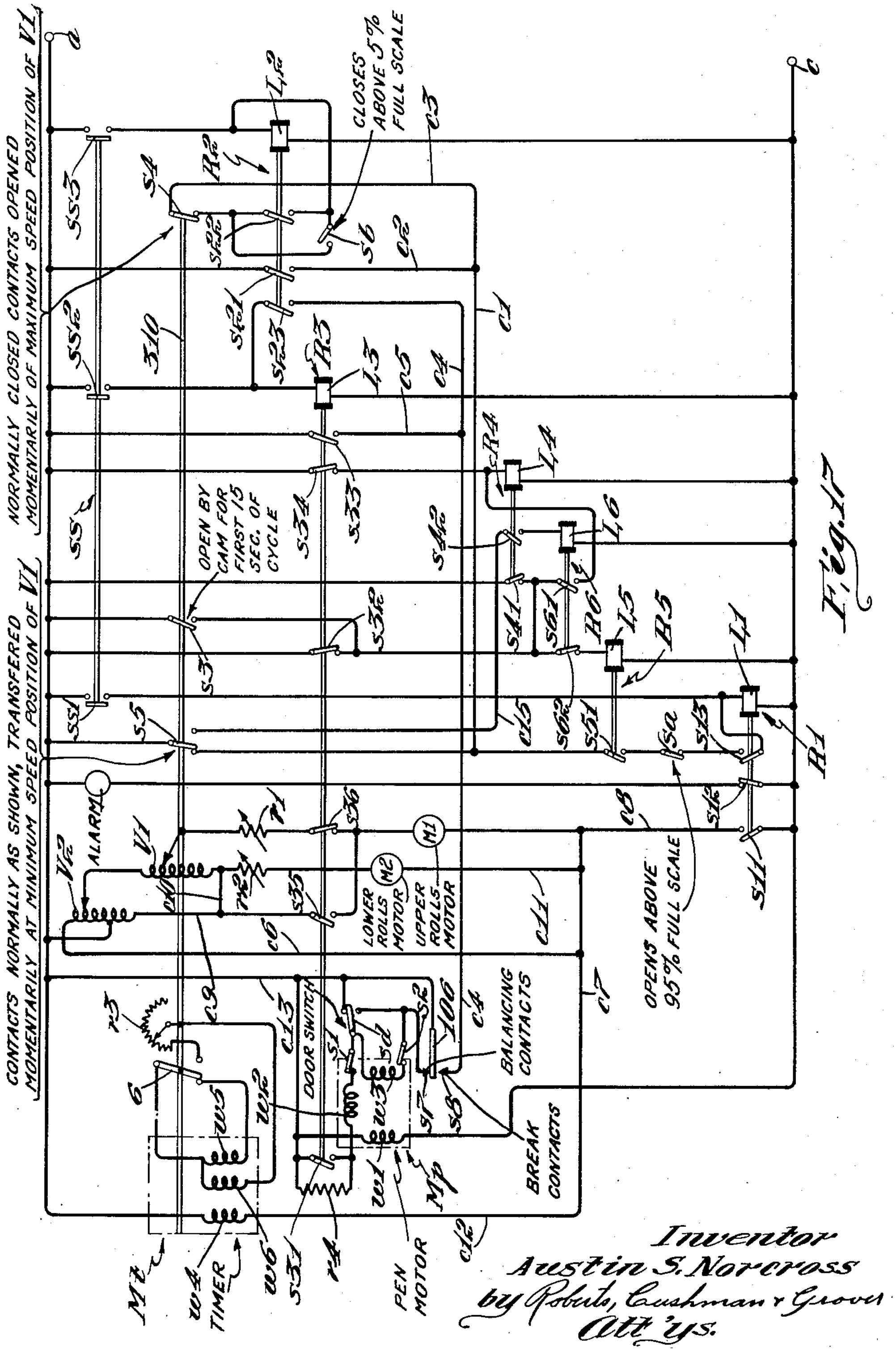
Fig. 17 is a wiring diagram of the electrical circuit of the tester.

In Fig. 11 is shown the upper and lower sets of rolls of a second embodiment of the invention wherein the rolls 80*a*, 76*a*, 78*a* and 82*a* of the upper set are of greater diameter than the rolls 38, 34, 46 and 40 of the lower set. The remaining elements are the same as those described heretofore with respect to the first embodiment described in detail. In this second embodiment the wiring diagram shown in Fig. 17 is changed, the contacts *s35* of the relay *r3* being shunted and the connection between the contacts *s36* and the upper roll motor M1 removed so that both roll driving motors M1 and M2 operate at substantially the same speed in either position of the relay R3. With both sets of rolls operating at the same speed, stress in the test sample is increased at a uniform rate because of the above mentioned differences in roll diameters so that the resulting record upon the chart R is a stress-strain diagram of the test sample. It is also possible to obtain similar results by using the same or different diameter rolls in the upper and lower sets by operating the motors M1 and M2 at different but uniform speeds after the test sample is threaded.

The electrical connections of the above described electrical elements are shown in Fig. 17, wherein *a* and *c* are terminals which are adapted to be connected to a power source (not shown) thereby to energize the associated buses. The solenoids L4 and L5 of the relays R4 and R5 are immediately energized transferring their contacts *s41* and *s42* and *s51* respectively. The testing cycle is started by momentarily depressing the starting button Ss thereby closing three sets of normally open contacts *ss1*, *ss2* and *ss3*. The closing of contacts *ss1* completes a circuit between terminals *a* and *c* to energize a solenoid L1 of the relay R1 thereby to transfer contacts *s11*, *s12* and *s13*. Upon the subsequent opening of the contacts *ss1*, the solenoid L1 remains energized through a holding circuit including the contacts *s13*, the switch *sa*, which is adjusted to remain closed at chart readings less than 95 per cent of full scale position of the stylus 208 as described heretofore, the contacts *s51*, conductors *c1* and *c2*, the contacts *s21* which are closed by the energization of the solenoid as has also been described heretofore, and the contacts *s21* of the relay R2.

The conjoint closing of contacts *ss3* energizes the solenoid L2 of the relay R2 whose holding circuit includes its holding contacts *s22*, the switch *s4*, the conductors *c3* and *c2* and the contacts *s21*. It will be noted that the contacts *s22* are paralleled by the closing of switch *sb* when the position of the recording stylus 208 is greater than 5 per cent of full scale as described heretofore; and that the contacts *s21*, which are included in the above-described holding circuits for both the solenoids L1 and L2, are paralleled by the normally closed contacts of the switch *s5* at all but the minimum speed settings of the variable impedance V1.

The contacts *ss2* energize the solenoid L3 of the relay R3. The holding circuit for the solenoid L3 includes the contacts *s23* of the relay R2, the conductors *c4* and *c5* and its holding contacts *s33*. It will be evident that the energization of the solenoid L3 opens the normally closed contacts *s34* to deenergize the solenoid L4 and conversely deenergization of the solenoid L3 results in the energization of solenoid L4.

The energizing of solenoid L1 and the resulting closing of the contacts *s11* energizes the timer motor Mt and the roll driving motors M1 and M2. The driving motor energizing circuit includes the variable impedance V2 one end of whose winding is connected to the power source terminal *c* by means of the conductors *c6*, *c7* and *c8* and the contacts *s11*. The power source terminal *a* is tied directly to an intermediate tap of the impedance V2. The opposite end of the winding of the impedance V2 from that connected to the terminal *c* is connected to one terminal of the lower roll drive motor M2 by means of conductors *c9* and *c10* and a variable resistor *r2* which is used to improve the load torque characteristics of the motor. The other terminal of the motor M2 is connected to the terminal *c* by means of conductors *c*11, *c*7 and *c*8 and the contacts *s*11. With the solenoid L3 energized so that the normally closed contacts *s*36 of the relay R3 are open and the normally open contacts *s*35 are closed, one terminal of the upper roll drive motor M1 is connected by means of contacts *s*35 and the conductor *c*9 to the same end of the winding of the impedance V2 as the one to which the terminal of the motor M2 is connected as described above. The other terminal of the motor M1 is connected to the terminal *c* by the conductor *c*8 and the contacts *s*11. As the voltage drop across the resistor *r*2 is negligible at no load, substantially the same voltage is applied to the motors M1 and M2 when the solenoid L3 is energized so that both motors operate at substantially the same speed whereby the yarn is under substantially no tension as it runs from the upper set to the lower set of rolls.

As mentioned above the closing of the contacts *s*11 also energizes the main winding *w*4 of the timer motor M*t* by means of a circuit including the terminal *c*, the contacts *s*11, the conductors *c*8, *c*7 and *c*12, the winding *w*4 and the terminal *a*. As the shaded winding *w*5 is shunted by the reversing switch *s*6, the motor M*t* rotates the shaft 310 towards the maximum speed position (i. e. the position of the shaft in which the variable impedance V1 will apply a maximum voltage to the motor M1 as will be described hereinafter).

Figure 12:
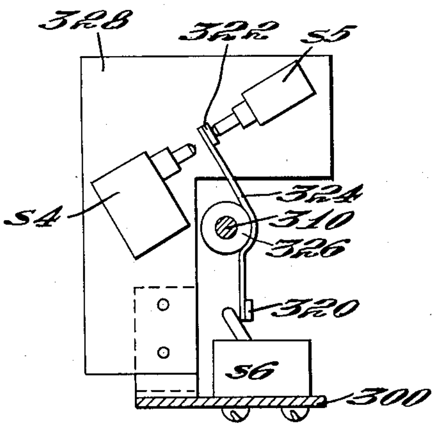
Fig. 12 is an enlarged fragmentary sectional view on line 12—12 of Fig. 9.

As the shaft 310 reaches its maximum speed position the finger 320 (Fig. 9) opens the normally closed switch *s*4 which deenergizes the solenoid L2. The resulting opening of the contacts *s*23 in the holding circuit of the solenoid L3 deenergizes the solenoid so that the contacts *s*34 close thus energizing solenoid L4. Simultaneously with the operation of switch *s*4, the toggle reversing switch *s*6 is tripped by the arm 324 (Fig. 12) so that the shunting connection is removed from the shaded winding *w*5 of the motor M*t* and the variable resistor *r*3 connected across its other shaded winding *w*6 thus reversing the timer motor M*t* so that shaft 310 starts towards its minimum speed position (i. e. the position 150° from defined maximum speed position wherein the impedance V1 will apply a minimum potential to the motor M1). As the shaft 310 rotates towards this minimum speed position, it moves the attached arm of the variable resistor *r*3 to increase the effective resistance shunting the shaded winding *w*5 so that the rotational speed of the motor M*t* is gradually decreased thereby to improve uniformity of application of tension to the test sample.

As mentioned above, the tension in the test sample is applied by decreasing the rotational speed of the upper roll driving motor M1 while maintaining the speed of the lower roll driving motor M2 approximately constant. Upon the deenergization of the solenoid L3 by the momentary opening of switch *s*4 as described above, the contacts *s*35 and *s*36 are transferred. Such transfer does not change the above described circuit energizing the motor M2 which continues to operate at the same speed. The motor M1 is disconnected from the variable impedance V2 by the opening of the contacts *s*35, the simultaneous closing of contacts *s*36 connecting the motor in a second energizing circuit including the variable impedance V1, one end of whose winding is connected by the conductors *c*10 and *c*9 to the lower end of the impedance V2. The other end of the winding of the impedance V1 is connected to a variable tap of the impedance V2, the position of which tap can be varied manually by means of the knob 334 (Fig. 9) thereby to change the time required to increase the tension to the rupture point of the test sample. The variable tap of the impedance V1 is moved by the rotation of the shaft 310 from the maximum speed position to reduce the voltage applied to the motor M1 so that the rotation speed of the motor and the speed of the upper set of rolls is gradually reduced.

As the speed of the upper rolls reduces, the tension in the test sample is gradually increased at a nonlinear rate because of the above mentioned action of the resistor *r*3 until the rupture point of the test sample is reached. This increase in the tension force is balanced by moving the rider 140 (Fig. 9) upon the weigh bar by means of the pen motor M*p* and a drive including the cord 154, the disc 170, the arm 174 (Fig. 7), the gear sector 190 and the motor pinion gear 181 as has been described in detail heretofore. The operation of the pen motor M*p* is controlled by the balancing contacts *s*7 carried upon the end of the contact arm 106 which contacts are closed when the arm rises due to increase in the tension exerted upon the upper set of rolls by the test sample. The closing of the contacts *s*7 shunts the shaded winding *w*3 through the contacts of the door switch *sd* so that the pen motor M*p* rotates in the direction which moves the rider 140 along the weigh bar 104 away from the center line of the pivots 116, thereby increasing the counterbalancing torque exerted by the rider. When the torque exerted by the rider 140 balances the torque resulting from the tension in the test sample, the contacts *s*7 open thereby removing the shunting connection across the shaded winding *w*3. The other shaded winding *w*2 is connected in series with a resistor *r*4 by the contacts of the door switch *sd* so that upon the removal of the shunting connection across the winding *w*3, the pen motor reverses and rotates at reduced speed to move the rider 140 in the direction to reduce the torque exerted thereby until the contact arm 106 moves upwardly to reclose the contacts *s*7. By means of the above arrangement, the "dead band" is eliminated and it is possible to balance the tension in the test sample by the use of only one pair of electrical contacts. The door switch *sd* is positioned as is shown in Fig. 3 so that opening of the inner door 24 causes the switch contacts to transfer, thereby to shunt the shaded winding *w*3 and move the rider 140 to the maximum torque position, thus insuring that the pin 170 (Fig. 8) engages the slot in the disc 70 when the door is again closed.

The above described operation of the motor M*p* to move the rider 140 also rotates the shaft 192 (Fig. 6) carrying the pen arm 204. The direction of rotation of the motor M*p* to increase the torque exerted by the rider 140 (Fig. 9) also moves the pen stylus 208 (Fig. 6) outwardly from the center of the chart R (Fig. 1) the length of the arc of movement of the stylus 208 (Fig. 6) being a direct function of the tension in the test sample. Conversely the reverse rotation of the motor M*p* to reduce the torque exerted by the rider 140 returns the stylus 208 so that the instantaneous position of the stylus is at all times a function of the tension in the test sample.

As the rotational speed of the upper set of rolls continues to reduce, the tension in the test sample increases until the stylus 208 reaches 5 per cent of full scale reading whereupon the contacts of switch *sb* are closed by movement of the bar 218 (Fig. 4) as has been described heretofore. Closing of the switch *sb* provides a circuit for energizing the solenoid L2 which is dropped out by the momentary opening of the switch *s4* at the maximum speed position of the switch *s4*, the energizing circuit including the terminal *a*, the conductors *c1* and *c3*, the switches *s4* and *sb* and the solenoid L2 to the terminal *c*.

The reduction in speed of the upper set of rolls continues until the rupture point of the test sample at which point the upper roll assembly drops to close the "break" contacts *s8* (Fig. 3) carried by the contact arm 106 before the rider 140 (Fig. 9) can be returned to bring the assembly into balance. As can be seen from Fig. 17, the closing of the "break" contacts *s8* energizes the solenoid L3 of the relay R3 by means of a circuit including the power source terminal *a*, a conductor *c13*, the contacts *s8*, the conductor *c4*, the contacts *s23* of the relay R2, the solenoid L3 and thence to the terminals *c*, the solenoid remaining energized through a holding circuit including the contacts *s33* and the contacts *s23* of the relay R2 which have previously closed by the energization of the relay as described above.

The energization of relay R3 simultaneously (1) opens contacts *s34* to deenergize the relay R4; (2) transfers contacts *s35* and *s36* to operate both the upper and lower sets of rolls at the same speed so that no tension is exerted in the test sample as it is rethreaded by the belts 58 and 60 (Fig. 10) as described heretofore; and (3) closes the contacts *s31* thereby to shunt the shaded winding *w2* of the timer motor *Mt* so that it operates at maximum speed to reduce the time required for the shaft 310 to reach the minimum speed position. When such position is reached the switch *s4* is momentarily opened to deenergize relays R2 and R3 and the switch *s6* simultaneously reverses the timer motor *Mt* to start the succeeding testing cycle.

The tester is entirely automatic in operation completing successive testing cycles and recording the rupture point without attention from the operator until one of the following abnormal conditions occur at which time the tester automatically stops and notifies the operator by means of the alarm A which, for example, may be a warning bell or signal light.

(1) *Chart readings below 5 per cent of full scale*

Low chart readings occur if no test sample is supplied to the tester, if the sample laps around the upper rolls, or if too many weights 140*a* (Fig. 9) are placed upon the rider 140. In any case the contacts of the switch *sb* are not closed so that after the holding circuit for the relay R2 is interrupted by the momentary opening of the switch *s4* at the maximum speed end of the cycle, the relay remains deenergized with the contacts *s33* in the open position. Upon the subsequent momentary opening of the contacts of the switch *s5* at the minimum speed end of the cycle, the relay R1 drops out. The resulting opening of the contacts *s11* deenergizes the roll motors M1 and M2 and the pen motor *Mp*, the conjoint closing of contacts *s12* energizing the alarm A. It will be noted that under normal operating conditions the closing of switch *sb* energizes the relay R2 closing the contact *s21* to complete a circuit paralleling the switch *s5* so that the momentary opening thereof at the minimum speed position of the shaft 310 does not interrupt the holding circuit for the relay R1.

(2) *Chart readings above 95 per cent full scale*

High chart readings result from too few weights 140*a* upon the rider 140. When the position of pen stylus 208 exceeds 95 per cent of the full scale reading of the chart R, the contacts of the switch *sa* are opened to interrupt the holding circuit of the relay R1 thus stopping the tester and sounding the alarm A by means of contacts *s12* in a manner similar to that described in detail above.

(3) *Time for rupture of sample less than 15 seconds*

Improper adjustment of the Variac V2 will result in too rapid an application of tension to obtain good test results. The cam 314 (Fig. 9) holds open the normally closed contacts of the switch *s3* for a period of 15 seconds after the shaft has been in its maximum speed position (i. e. during the first 15 seconds of application of tension). Upon the rupture of the test sample the relay R3 is energized through the "break" contacts *s8*, as described above. During the 15 second period when the switch *s3* is held open by the cam 314 the opening of the contacts *s32* upon the energization of relay R3 deenergizes the solenoid L5 of the relay R5 so that its contacts *s51* interrupt the holding circuit for the relay R1. The transfer of the contacts of relay R1 stops the tester and operates the alarm A as in the two previous abnormal operating conditions described above. When the tester is operating normally the relay R5 remains energized through the switch *s3* upon the opening of contacts *s32*.

(4) *Time for rupture of sample greater than 45 seconds*

Conversely if the adjustment of V2 is such that the application of the tension to the test sample is so slow that the 45 seconds required for the timer to move the shaft 310 to the minimum speed position of V1 does not cause the test sample to rupture, the relay R3 is not closed by the "break" contacts *s8* so that the relay R4 remains energized through the contacts *s34*. At the minimum speed position of shaft 310, the momentary transfer of the contacts of the switch *s5* energizes the relay R6 from the terminals *a* and *c* by means of a circuit including the normally open contacts of the switch *s5*, a conductor *c15*, the contacts *s42* and the relay solenoid L6. The energization of relay R6 opens contacts *s62* thus deenergizing relay R5 to open the contacts *s51* in the holding circuit of the relay R1 thereby to stop the tester and energize the alarm A.

It is also possible to use the above described apparatus to obtain static test results and to measure the elongation of the test sample. To this end after the rolls have been automatically threaded by the belts 58 and 60, as has been described in detail heretofore, the upper set of rolls are stopped and the lower set of rolls moved very slowly, i. e. creep until a yarn break occurs. The breaking tension obtained in this manner may be closely correlated with the readings from other types of static test apparatus. The creeping movement of the lower set of rolls is a direct measure of the elongation of the test sample.

It should be understood that the present disclosure is for the purpose of illustration only and that this invention includes all modifications and equivalents which fall within the scope of the appended claims.

I claim:

1. A testing device for yarn comprising two sets of rolls arranged in spaced relationship to grip a sample one set of which is movably mounted with respect to the other set, separate driving means for the respective sets of rolls, means for threading the yarn so that it successively runs through the respective sets of rolls, means for controlling the rotational speed of one set of rolls with respect to the other set, restraining means for holding the movably mounted set of rolls against the force exerted by the tension in the yarn, and measuring means operated by the restraining means for determining such tension force.

2. A testing device for yarn comprising two sets of rolls arranged in spaced relationship to grip a sample one set of which is movably mounted with respect to the other set, separate driving means for the respective sets of rolls, each set including two inner rolls and two outer rolls having their axes arranged in parallel relationship and the peripheral surface of each inner roll in contact with both the peripheral surface of the other inner roll and with the peripheral surface of a respective outer roll, means for threading the yarn so that it successively runs between one pair of inner and outer rolls, thence between the inner rolls and thence between the second pair of inner and outer rolls of both sets of rolls, means for controlling the rotational speed of one set of rolls with respect to the other set, restraining means for holding the movably mounted set of rolls against the force exerted by the tension in the yarn, and measuring means operated by the restraining means for determining such tension force.

3. A testing device for yarn comprising two sets of rolls arranged in spaced relationship to grip a sample one set of which is movably mounted with respect to the other set, separate driving means for the respective sets of rolls, each set including two inner rolls and two outer rolls having their axes arranged in parallel relationship and the peripheral surface of each inner roll adjacent both the peripheral surface of the other inner roll and with the peripheral surface of a respective outer roll, two motors coupled respectively to one roll of each set, the remaining rolls of each set being driven by the frictional contact, means for threading the yarn so that it successively runs between one pair of inner and outer rolls, thence between the inner rolls, thence between the second pair of inner and outer rolls of the both sets of rolls, means for controlling the rotational speed of one motor so that the peripheral speed of the corresponding set of rolls is reduced with respect to the other set, restraining means for holding the movably mounted set of rolls against the force exerted by the tension in the yarn, and measuring means operated by the restraining means for determining such tension force.

4. A testing device for yarn comprising two sets of rolls arranged in spaced relationship to grip a sample one set of which is pivotally mounted with respect to the other set, separate driving means for the respective sets of rolls, means for threading the yarn so that it successively runs through the respective sets of rolls, means for controlling the rotational speed of one set of rolls with respect to the other set, a weigh bar for restraining the pivotally mounted set of rolls against the force exerted by the tension in the yarn, and measuring means operated in response to a change in position of the bar for determining such tension force.

5. A testing device for yarn comprising two sets of rolls arranged in spaced relationship to grip a sample one set of which is pivotally mounted above the other set, separate driving means for the respective sets of rolls, two driving motors coupled respectively to one roll of each set, the remaining rolls of each set being driven by the frictional contact, the motor driving the pivotally mounted set of rolls being arranged to move conjointly therewith, means for threading the yarn so that it successively runs through the respective sets of rolls, means for controlling the rotational speed of one motor so that the peripheral speed of the corresponding set of rolls is reduced with respect to the other set, a weigh bar for holding the pivotally mounted set of rolls against the force exerted by the tension in the yarn, and measuring means operated in response to a change in position of the bar for determining such tension force.

6. A testing device for yarn comprising two sets of rolls arranged in spaced relationship to grip a sample one set of which is pivotally mounted with respect to the other set, separate driving means for the respective sets of rolls, means for threading the yarn so that it successively runs through the respective sets of rolls, means for controlling the rotational speed of one set of rolls with respect to the other set, a weigh bar attached to the pivotally mounted set of rolls, balancing means for automatically adjusting the weigh bar so that the pivotally mounted set of rolls is held against the force exerted by the tension in the yarn, and measuring means operated in response to a change in position of the bar for determining such tension force.

7. A testing device for yarn comprising two sets of driven rolls one set of which is pivotally mounted with respect to the other set, a motor operated at constant speed for driving one set of rolls, a variable speed motor for driving the second set of rolls, means for threading the yarn so that it successively runs through the respective sets of rolls, means for controlling the rotational speed of one set of rolls with respect to the other set, a weigh bar attached to the pivotally mounted set of rolls, a rider movably mounted on the weigh bar, balancing means for automatically positioning the rider on the weigh bar so that the pivotally mounted set of rolls is restrained against the force exerted by the tension in the yarn, said balancing means including a reversible motor, coupling means for mechanically connecting the rider to the reversible motor so that the rider can be moved with respect to the bar, and electrical contacts operated by the movement of the weigh bar to supply power to the motor so that the motor rotates to move the rider in the direction to maintain the weigh bar in balance, and recording means operated by the reversible motor for continuously recording such tension force.

8. A testing device for yarn comprising two sets of driven rolls one set of which is pivotally mounted with respect to the other set, a motor operated at constant speed for driving one set of rolls, a variable speed motor for driving the second set of rolls, means for threading the yarn so that it successively runs through the respective sets of rolls, means for controlling the rotational speed of one set of rolls with respect to the other set, a weigh bar attached to the pivotally mounted set of rolls, a rider movably mounted on the weigh bar, balancing means for automatically positioning the rider on the weigh bar so that the pivotally mounted set of rolls is restrained against the force exerted by the tension in the yarn, said balancing means including a reversible motor having two shaded windings, coupling means for mechanically connecting the rider to the reversible motor so that the rider can be moved with respect to the bar, a pair of electrical contacts closed by the weigh bar when it is at one limit of its path of travel to shunt one of the shaded windings so that the rider is moved along the bar in a direction to balance the load, and a resistor connected in series with the other shaded winding so that the rider is moved in the opposite direction when the contacts are open, and recording means operated by the reversible motor for continuously recording such tension force.

9. A testing device for yarn comprising two sets of rolls arranged in spaced relationship to grip a sample one set of which is movably mounted adjacent the other set, separate driving means for the respective sets of rolls, two belts positioned to receive the yarn subsequent to its emerging from the first set of rolls, said belts passing through the second set of rolls in abutting relationship thereby automatically carrying the yarn through the second set of rolls after it has passed through the first set so that it successively runs through the respective sets of rolls, means for controlling the rotational speed of one set of rolls with respect to the other set, restraining means for holding the movably mounted set of rolls against the force exerted by the tension in the yarn, and measuring means operated by the restraining means for determining such tension force.

10. A testing device for yarn comprising two sets of driven rolls, one set of which is movably mounted adjacent the other set, each set including two inner rolls and two outer rolls having their axes arranged in parallel relationship and the peripheral surface of each inner roll adjacent both the peripheral surface of the other inner roll and with the peripheral surface of a respective outer roll, two belts for threading the yarn into the second set of rolls, each belt passing over an idler roll thence between one pair of inner and outer rolls of the second set, thence between the inner rolls and thence between the second pair of inner and outer rolls of a respective set of rolls, the idler rolls being located so that the belts form a V slot as they approach the first pair of inner and outer rolls into which slot the yarn enters after passing through the upper rolls so that it is picked up and threaded through the second rolls by the belts, means for controlling the rotational speed of one set of rolls with respect to the other set, restraining means for holding the movably mounted set of rolls against the force exerted by the tension in the yarn, and measuring means operated by the restraining means for determining such tension force.

11. A testing device for yarn comprising two sets of yieldable rolls one set of which is pivotally mounted with respect to the other set, each set including two inner rolls and two outer rolls having their axes arranged in parallel relationship in a common plane, a journal block for journalling each end of each roll respectively, spring means for urging the blocks at corresponding ends of the rolls towards each other thereby to bring the peripheral surfaces of adjacent rolls into contact with each other, a motor operated at constant speed for driving one of the rolls of one set, a variable speed motor for driving one of the rolls of a second set, the remaining rolls being driven by frictional contact with the adjacent rolls, means for threading the yarn so that it successively runs through the respective sets of rolls, means for controlling the rotational speed of the variable speed motor so that the set of rolls driven thereby is varied in peripheral speed with respect to the other set, restraining means for holding the movably mounted set of rolls against the force exerted by the tension in the yarn, and measuring means operated by the restraining means for determining such tension force.

12. A testing device for yarn comprising two sets of driven rolls, one set of which is pivotally mounted with respect to the other set, a motor operated at substantially constant speed for driving one set of rolls, a variable speed motor for driving the other set of rolls, means for threading the yarn so that it successively runs through the respective sets of rolls, means including a timer and speed changing means operated by said timer and connected with said variable speed motor for changing the rotational speed of the variable speed motor so that the peripheral speed of the first set of rolls through which the yarn passes is gradually decreased relatively to the peripheral speed of the last set of rolls, balancing means for restraining the pivotally mounted set of rolls against the force exerted by the tension in the yarn, and measuring means operated by the balancing means for determining such tension force.

13. A testing device for yarn comprising two sets of driven rolls, one set of which is pivotally mounted with respect to the other set, a motor operated at constant speed for driving one set of rolls, a variable speed motor for driving the other set of rolls, means for threading the yarn so that it successively runs through the respective sets of rolls, control means including a timer having a motor with a shaded winding, two variable impedances operated by said timer, one of the impedances being connected with said variable speed motor for controlling the rotational speed of the variable speed motor so that the peripheral speed of the first set of rolls through which the yarn passes is gradually decreased relatively to the peripheral speed of the last set of rolls, the other impedance being connected to gradually increase the resistance in series with the shaded winding thereby to decrease the rate of variation of speed of the variable speed motor as the breaking point of the yarn is approached, balancing means for restraining the pivotally mounted set of rolls against the force exerted by the tension in the yarn, and measuring means operated by the restraining means for determining such tension force.

14. A testing device for yarn comprising two sets of driven rolls, one set of which is pivotally mounted with respect to the other set, a motor operated at constant speed for driving one set of rolls, a variable speed motor for driving the other set of rolls, means for threading the yarn so that it successively runs through the respective sets of rolls, control means including a cyclic timer having a motor with two shaded windings, two limit switches each connected in series with a respective shaded winding and operated respectively at opposite ends of the timer cycle to reverse the timer motor, two variable impedances operated by said timer, one of the impedances being connected with said variable speed motor for gradually reducing the rotational speed of the variable speed motor so that the peripheral speed of the first set of rolls through which the yarn passes is gradually decreased relatively to the peripheral speed of the last set of rolls, the other impedance being connected in series with one shaded winding and the corresponding limit switch thereby to decrease the rate of reduction of speed of the variable speed motor as the breaking point of the yarn is approached, balancing means for restraining the pivotally mounted set of rolls against the force exerted by the tension in the yarn, and measuring means operated by the restraining means for determining such tension force.

15. In a testing device for a tenuous material such as yarn, two sets of rolls arranged in spaced relationship to grip a sample of the yarn to be tested, one set of rolls being movably mounted with respect to the other set, each set including a plurality of rolls having their axes in parallel relationship with the peripheral surface of each roll in contact with the peripheral surface of adjacent rolls, means for driving the sets of rolls to vary the peripheral speed of one set with respect to the peripheral speed of the other set, the yarn may be threaded through the rolls of each set to pass successively around a first roll, thence between the first roll and the adjacent second roll, thence around the second roll and thence between the second roll and an adjacent third roll thereby to prevent slippage of the yarn with respect to the periphery of the rolls, and tension measuring means for restraining the movably mounted set of rolls against the force exerted by the tension in the yarn to give an indication thereof as the peripheral speed of one set of rolls is varied with respect to the speed of the other set.

16. In a testing device for a tenuous material such as yarn, two sets of driven rolls arranged in spaced relationship to grip a sample of the yarn to be tested, one set of which rolls is movably mounted with respect to the other set, each set including a plurality of rolls having their axes in parallel relationship with the peripheral surface of each roll in contact with the peripheral surface of adjacent rolls, two motors coupled respectively to one roll of each set, the remaining rolls of each set being driven by the frictional contact between the peripheral surfaces thereof, whereby the yarn may be threaded through the rolls of each set to pass successively around a first roll, thence between the first roll and the adjacent second roll, thence around the second roll and thence between the second roll and an adjacent third roll thereby to prevent slippage of the yarn with respect to the periphery of the rolls, and tension measuring means for restraining the movably mounted set of rolls against the force exerted by the tension in the yarn to give an indication thereof as the peripheral speed of one set of rolls is varied with respect to the speed of the other set.

17. In a testing device for a tenuous material such as yarn, two sets of yieldable rolls arranged in spaced relationship to grip a sample of the yarn to be tested, one set of which rolls is pivotally mounted with respect to the other set, each set including a plurality of rolls having their axes arranged in parallel relationship in a common plane, a journal block for journaling each end of each roll respectively, spring means for urging the blocks at corresponding ends of the rolls towards each other thereby to bring the peripheral surfaces of adjacent rolls into contact with each other, a motor operated at constant speed for driving one of the rolls of one set, a variable speed motor for driving one of the rolls of the second set, the remaining rolls being driven by frictional contact with the adjacent rolls, whereby the yarn may be threaded through the rolls so that it successively runs through the respective sets of rolls thereby to prevent slippage of the yarn when the rotational speed of one set of rolls is varied with respect to the rotational speed of the other set of rolls and tension measuring means for restraining the pivotally mounted set of rolls against the force exerted by the tension in the yarn to give an indication thereof as the peripheral speed of one set of rolls is varied with respect to the other set.

18. In a testing device for a tenuous material such as yarn, two sets of driven rolls arranged in spaced relationship to grip a sample of the yarn to be tested one set of which rolls is pivotally mounted with respect to the other set, two driving motors coupled respectively to one roll of each set, the remaining rolls of each set being driven by the frictional contact between the peripheral surfaces thereof, the motor driving the pivotally mounted set of rolls being arranged to move conjointly therewith, whereby the yarn may be threaded through the rolls so that it successively runs through the respective sets of rolls, and a weigh bar for holding the pivotally mounted set of rolls against the force exerted by the tension in the yarn when the peripheral speed of one set of rolls is different than that of the other set thereby to give an indication of the tension in the yarn.

19. In a testing device for a tenuous material such as yarn, two sets of driven rolls arranged in spaced relationship to grip a sample of the yarn to be tested, one set of which rolls is pivotally mounted with respect to the other set, whereby the yarn may be threaded through the rolls so that it successively runs through the respective sets of rolls, and tension measuring means including a weigh bar attached to the pivotally mounted set of rolls and balancing means for automatically adjusting the weigh bar so that the pivotally mounted set of rolls is held against the force exerted by the tension in the yarn when the peripheral speed of one set of rolls is different than that of the other set.

20. In a testing device for a tenuous material such as yarn, two sets of driven rolls arranged in spaced relationship to grip a sample of the yarn to be tested, one set of which rolls is pivotally mounted with respect to the other set, a motor operated at constant speed for driving one set of rolls, a variable speed motor for driving the second set of rolls, whereby the yarn may be threaded through the rolls so that it successively runs through the respective sets of rolls, a weigh bar attached to the pivotally mounted set of rolls, a rider movably mounted on the weigh beam, balancing means for automatically positioning the rider on the weigh beam so that the pivotally mounted set of rolls is restrained against the force exerted by the tension in the yarn when the peripheral speed of one set of rolls is different than that of the other set, said balancing means including a reversible motor, coupling means for mechanically connecting the rider to the reversible motor so that the rider can be moved with respect to the bar, and electrical contacts operated by the movement of the weigh bar to supply power to the reversible motor so that the motor rotates to move the rider in the direction to maintain the weigh bar in balance.

21. In a testing device for a tenuous material such as yarn, two sets of driven rolls arranged in spaced relationship to grip a sample of the yarn to be tested, one set of which rolls is pivotally mounted with respect to the other set, a motor operated at constant speed for driving one set of rolls, a variable speed motor for driving the second set of rolls, whereby the yarn may be threaded through the rolls so that it successively runs through the respective sets of rolls, a weigh bar attached to the pivotally mounted set of rolls, a rider movably mounted on the weigh beam, balancing means for automatically positioning the rider on the weigh beam so that the pivotally mounted set of rolls is restrained against the force exerted by the tension in the yarn when the peripheral speed of one set of rolls is different than that of the other set, said balancing means including a reversible motor having two shaded windings, coupling means for mechanically connecting the rider to the reversible motor so that the rider can be moved with respect to the bar, a pair of electrical contacts closed when the weigh bar is in raised position to short circuit one of the shaded windings so that the rider is moved along the bar in a direction to balance the load, and a resistor connected in series with the other shaded winding so that the rider is moved in the opposite direction when the contacts are open.

22. In a testing device for a tenuous material such as yarn, two sets of driven rolls arranged in spaced relationship to grip a sample of the yarn to be tested, one set of which rolls is mounted adjacent the other set, each set including a plurality of rolls having their axes in parallel relationship with the peripheral surface of each roll in contact with the peripheral surface of adjacent rolls, and two belts for threading the yarn into the second set of rolls, each belt passing over a respective idler roll and thence between the second and third rolls of the second set, the idler rolls being located in spaced relationship so that the belts form a V slot as they approach the second and third rolls into which slot the yarn enters after passing through the first set of rolls so that it is picked up and threaded through the second set of rolls by the belts.

23. In a testing device for a tenuous material such as yarn, two sets of driven rolls arranged in spaced relationship to grip a sample of the yarn to be tested, one set of which rolls is pivotally mounted with respect to the other set, a motor operated at constant speed for driving one set of rolls, a variable speed motor for driving the second set of rolls, whereby the yarn may be threaded through the rolls so that it successively runs through the respective sets of rolls, control means including a timer having a motor with a shaded winding, and two variable impedances operated by said timer, one of the impedances being connected with said variable speed motor for gradually reducing the rotational speed of the variable speed motor so that the peripheral speed of the first set of rolls through which the yarn passes is gradually decreased relatively to the peripheral speed of the last set of rolls thereby to increase the tension in the yarn, the other impedance being connected to gradually increase the resistance in series with the shaded winding thereby to decrease the rate of reduction of speed of the variable speed motor as the breaking point of the yarn is approached and tension measuring means for restraining the pivotally mounted set of rolls against the force exerted by the tension in the yarn to give an indication thereof as the peripheral speed of one set of rolls is varied with respect to the other set.

24. In a testing device for a tenuous material such as yarn, two sets of driving rolls arranged in spaced relationship to grip a sample of the yarn to be tested, one set of which rolls is pivotally mounted with respect to the other set, a motor operated at constant speed for driving one set of rolls, a variable speed motor for driving the second set of rolls, whereby the yarn may be threaded through the rolls so that it successively runs through the respective sets of rolls, control means including a cyclic timer having a motor with two shaded windings, two limit switches each connected in series with a respective shaded winding and operated respectively at opposite ends of the timer cycle to reverse the timer motor, and two rheostats operated by said timer, one of the rheostats being connected with said variable speed motor for gradually reducing the rotational speed of the variable speed motor so that the peripheral speed of the first set of rolls through which the yarn passes is gradually decreased relatively to the peripheral speed of the last set of rolls, thereby to increase the tension in the yarn, the other rheostat being connected in series with one shaded winding and the corresponding limit switch thereby to decrease the rate of reduction of speed of the variable speed motor as the breaking point of the yarn is approached and tension measuring means for restraining the pivotally mounted set of rolls against the force exerted by the tension in the yarn to give an indication thereof as the peripheral speed of one set of rolls is varied with respect to the other set.

AUSTIN S. NORCROSS.

REFERENCES CITED

The following references are of record in the file of this patent:

UNITED STATES PATENTS

| Number | Name | Date |
|---|---|---|
| 1,168,870 | Faulkner | Jan. 18, 1916 |
| 1,851,895 | Cornet | Mar. 29, 1932 |
| 1,961,755 | Foster | June 5, 1934 |
| 1,962,028 | Murphy | June 5, 1934 |